United States Patent Office 3,408,229
Patented Oct. 29, 1968

3,408,229
BATTERY EMPLOYING AMMONIA
AS A SOLVENT
Ken Posey, Jr., Allen, and James K. Truitt, Dallas, Tex.,
assignors to Texas Instruments Incorporated, Dallas,
Tex., a corporation of Delaware
Filed July 26, 1965, Ser. No. 474,835
15 Claims. (Cl. 136—6)

This invention relates to batteries, more particularly to batteries utilizing ammonia as a solvent for electrochemically active material.

The attractiveness of ammonia as a battery solvent stems, in great part, from the comparatively low freezing point of ammonia. Accordingly, various battery systems using ammonia have been proposed in an effort to provide an efficient battery operable at low temperatures. In general, however, the efficiency and operating life of such ammonia batteries and/or their method of fabrication have been far short of satisfactory.

An object of the present invention is to provide a battery, employing ammonia as a solvent, which gives efficient, high output performance; which has a comparatively long life; and which may be fabricated in a comparatively simple manner. It is an additional object to provide a battery which may be maintained in a dormant, substantially nondeteriorating state until ready for use and which may then be quickly activated.

In accordance with the present invention, a battery is provided which comprises an anode and a cathode enclosed in a casing. The cathode comprises an electrode immersed in a solution of sulphur in ammonia, with thiocyanate ion being provided for the solution by potassium thiocyanate, ammonium thiocyanate, or the like. An untreated, thin cellophane membrane separates the anode and cathode and contacts each.

The anode may be liquid, in which case the lithium or other anode metal is dissolved in ammonia, or it may be solid, preferably solid lithium.

Figure 1:
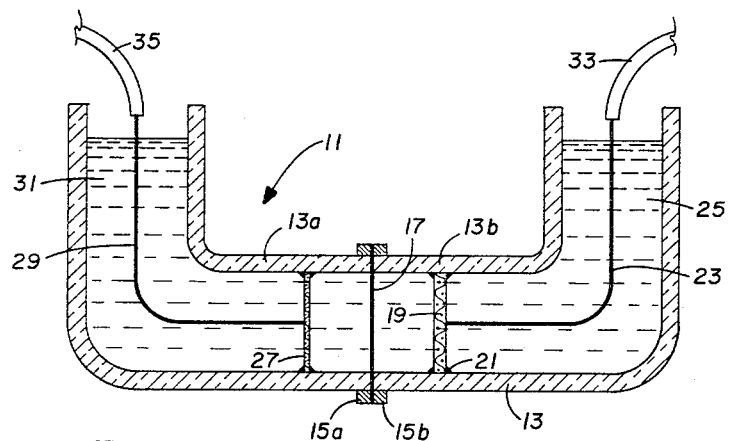
Figure 2:
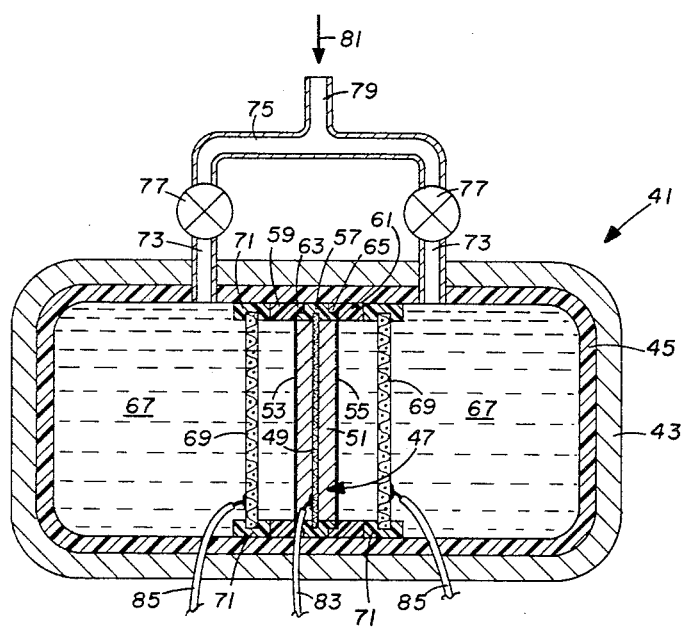

For a more complete understanding of the present invention and for further objects and advantages thereof, reference may now be had to the following description taken in conjunction with the accompanying drawings in which:

FIGURE 1 is an elevational sectional view through a battery in accordance with the present invention; and FIGURE 2 is an elevational sectional view through another embodiment of a battery in accordance with the present invention.

Referring now to FIGURE 1, therein is illustrated a battery 11 in accordance with the present invention. The battery 11 is enclosed within the insulated casing 13, which may be made of glass, for example. Casing 13 is generally U-shaped. It comprises a pair of tubular glass elbows 13a and 13b, each of which carries a flange formed on one end thereof. Such flanges, identified as 15a and 15b, are disposed in abutting relation so that the adjacent portions of glass elbows 13a and 13b are coaxial and aligned. The flanges are tightly held together, as by clamps, bolts through suitable apertures in the flanges, or other well-known means, not illustrated. An O-ring or other conventional sealing structure may be utilized to insure a good seal, if desired. A thin cellophane membrane 17 lies across the casing 13, being held taut between the flanges 15a and 15b. This membrane separates the U-tube into two compartments, one being defined by the interior of glass elbow 13a and the other by the interior of glass elbow 13b.

A nickel screen 19, for example a 100 mesh screen, is supported transversely across the lower interior portion of elbow 13b. This screen may be held in place, for example, by adhesive 21, which may be epoxy resin. Alternatively, the screen may be held by shoulders formed within the elbow 13b. Since it is of a resilient nature, it may be sprung into a supported position with respect to such shoulders. A conductor 23 has its bare end-portion conductively attached to the screen 19, as by welding or other suitable means. A catholyte solution 25 is contained within elbow 13b. The conductor 23 emerges from the solution 25 and serves as the cathode lead to an external load, not illustrated.

A stainless steel screen 27 is disposed near the flange end of glass elbow 13a, being supported transversely therein in similar manner to the support provided screen 19 in glass elbow 13b. A conductor 29 has its bare end-portion conductively connected to the screen 27, as by welding or other suitable means. An anode solution 31 is contained within elbow 13a. The conductor 29 passes from the upper end of elbow 13a and provides the anode lead to the external load for which conductor 23 serves as the cathode lead.

Insulation 33 and 35 may be provided for the conductors 23 and 29, respectively.

The catholyte solution 25, in combination with the nickel screen 19, which might also be described as a nickel electrode, provides the cathode for the battery 11. The catholyte solution 25 consists of sulphur carried in anhydrous ammonia, with thiocyanate included to increase conductivity. The thiocyanate ion may be provided, for example, by potassium thiocyanate or ammonium thiocyanate carried in the catholyte solution.

The anode for the battery 11 is provided by the anode solution 31. While a stainless steel screen 27 is used in the embodiment of FIGURE 1, the bare conductor 29, alone, can be used, the screen 27 being provided merely as a matter of convenience and to increase efficiency somewhat. The anode solution 31 consists of lithium dissolved in anhydrous ammonia. Other materials, such as sodium, potassium, magnesium, calcium, and the other members of alkali metal and alkaline earth metal families may be used in place of the lithium, but they are not so satisfactory in that the power available per unit weight is less.

It is important that the cellophane membrane 17 be free of treating materials, specifically water-resistant material, often found on commercially available cellophane. For example, cellophane often carries a moisture-proof film. It has been found that this moisture-proof film not only increases electric resistance, but promotes formation of gas bubbles. Such bubbles cause current stoppage. It is therefore seen that cellophane, untreated with such constituents, is essential to good performance and such untreated cellophane is described hereinafter, including in the claims, as "a membrane consisting essentially of cellophane."

The thickness of the membrane consisting essentially of cellophane may be varied considerably but good results are obtained with a thickness of one mil.

The function of the battery 11 is not in all respects understood, however the membrane 17 serves as a barrier to prevent the passage of lithium into the cathode side of the U-tube, i.e., into the catholyte solution 25. Conversely, the passage of sulphur into the anode solution 31 is prevented by the membrane 17. On the other hand, the membrane 17 appears to permit the free passage of ions therethrough. The action occurring at the nickel screen 19 is not clear, but it appears that the formation of sulphide ion occurs at the surface of screen 19.

The anode solution 31 is operable over a wide concentration range. Under proper temperature, pressure and concentration, lithium and ammonia form a two-phase solution. The lighter, more concentrated phase is of a metallic bronze color and is metallically conductive. The heavier dilute phase is of a deep blue color, characteristic of solutions of alkali metals in ammonia. The bronze phase may be obtained by concentrating a blue solution, obtained by mixing lithium with anhydrous ammonia under ambient conditions. The concentration is accomplished at ambient pressure by boiling away a part of the ammonia. Either of the bronze or blue solutions acts as a highly active anode at its interface with the cellophane membrane 17, and, accordingly, either may be used.

The catholyte solution 25 contains sulphur in concentration ranging from about 5% up to about 40%, by weight. Thiocyanate is preferably provided to increase catholyte conductivity. Best results are obtained when the thiocyanate ion level reaches the concentration provided by a 20%–30% content of potassium thiocyanate, based on the total solution weight, but any concentration, from a trace quantity up to the solubility limit of the potassium thiocyanate may be employed to some advantage. Ammonium thiocyanate may be used in place of potassium thiocyanate, if desired.

Quite surprisingly, it has been found that a battery of the nature of battery 11 of FIGURE 1 may be made to function satisfactorily when the anode solution 31 is replaced by a solid anode. Most desirably, the solid anode is made of lithium. An embodiment including a solid anode is discussed hereinafter and it is believed its application in a system of the nature of FIGURE 1 will be evident in view of such discussion.

FIGURE 2 illustrates a battery in accordance with the present invention which is adapted for high pressure operation and which includes provision for introduction of ammonia to activate the battery at such time as it is desired that the use of the battery be commenced. In FIGURE 2, the numeral 41 illustrates generally a high pressure battery unit which includes the elongated steel shell 43, generally circular in transverse section, which encases and structurally supports complimentary shaped insulated casing 45 within it. Insulated casing 45 may be made of various materials, e.g., high impact polystyrene, polyethylene, etc. A lithium anode element 47 is centrally supported to lie across the cavity within casing 45. Element 47 includes the stainless steel screen 49, solid lithium 51, compressed about and extending axially from the face of the screen in both directions, and membranes 53 and 55, each of which consists essentially of cellophane. The membrane 53 engages the solid lithium on one of its outer surfaces and the membrane 55 engages the solid lithium on the other outer surface. Each of these membranes 53 and 55 lie entirely across the cavity of plastic casing 45. The insulation and support of anode element 47 is facilitated by the annular plastic washer 57, which is centrally grooved along its internally facing surface to define shoulders to receive stainless steel screen 49, which may be sprung into position. The washer 57 may be fused or bonded to casing 45, e.g., by epoxy resin. The cellophane membranes 53 and 55 lie taut against the respective opposite surfaces of the lithium 51 and are held in position by support rings 59 and 61, respectively. Preferably shoulders 63 and 65, respectively, are formed on the support rings 59 and 61. These shoulders engage mating depressions formed in the plastic washer 57. Epoxy resin or other suitable bonding material may be used to adhere the rings 59 and 61 to the washer 57 and bond the cellophane membranes 53 and 55 firmly in place; alternatively the rings and washer may be fused together.

The anode element 47 divides the casing 45 into a pair of cathode compartments 67, each adapted to contain catholyte solution. Moreover, a nickel screen 69 is provided for each compartment, and is preferably disposed generally parallel to the anode element 47, lying axially spaced a short distance therefrom. Each screen 69 may be supported by an annular washer 71, which is suitably grooved on its internal surfaces to receive the edges of the screen. The annular washer is preferably of a plastic material and is bonded with respect to the casing 45, as by fusion, epoxy resin, or other suitable means. Further support is provided by engagement of an axially disposed side of each washer 71 with the adjacent outward side of support rings 59 and 61.

Nipples 73 lead from each of the compartments 67, passing in sealed engagement through the walls of casing 45 and steel shell 43. A manifold 75 is connected to each of nipples 73 through flow valves 77. A feed line 79 leads from manifold 75. A source of anhydrous ammonia under pressure, illustrated schematically by arrow 81, is connected to feed line 79.

The system of FIGURE 2 is illustrated after the valves 77 have been opened to admit anhydrous ammonia into each of the compartments 67. Prior to the opening of such valves, the compartments contain predetermined quantities of sulphur and a thiocyanate, for example, potassium thiocyanate. The opening of valve 77 permits the ammonia to flow into the compartments 67 and essentially fill them. The sulphur and thiocyanate accordingly are dissolved within the anhydrous ammonia. Almost instantaneously after valves 77 are opened, it is seen that the battery unit 41 is activated. The conductor 83, the bare end-portion of which is connected to stainless steel screen 49, serves as the anode lead for attachment to an external load, and the conductors 85, the bare end-portions of which are connected to the nickel screens 69, serve as the cathode leads to such external load.

Solid lithium anodes for the present invention may be prepared by pressing freshly-cut lithium onto a screen, for example, the stainless steel screen 49 previously described herein, and encasing it between cellophane membranes while under an atmosphere of argon or helium. If such precautions are not taken, the lithium has been found to become so tarnished as to disable proper operation in a battery.

Solid anodes of the general nature of that disclosed in connection with FIGURE 2 may utilize various other members of the alkali metal and alkaline earth metal families. After lithium, magnesium is the preferred material for such solid electrodes.

The electrode elements associated with the catholyte solution and discussed in connection with FIGURES 1 and 2 (identified by numerals 19 and 69, respectively) may be of various materials, nickel, silver, gold, iron, platinum, and cobalt being exemplary.

If desired, the electrode may comprise a member plated or otherwise coated with one of such metals.

The electrode elements associated with the anode and discussed in connection with FIGURES 1 and 2 (identified by numerals 17 and 49, respectively) may be of any material that is a good conductor. Preferably such material should possess characteristics that permit it to retain structural inegrity for at least a substantial period of time in the environment of the anode.

Having described the invention in connection with certain specific embodiments thereof, it is to be understood that further modifications may now suggest themselves to those skilled in the art and it is intended to cover such modifications as fall within the scope of the appended claims.

What is claimed is:
1. A battery comprising:
an anode,
a cathode, and
casing means enclosing said anode and said cathode,
said anode comprising a member selected from the group consisting of alkali metals and alkaline earth metals,
said cathode comprising a solution of sulphur in ammonia, said solution carrying thiocyanate ion and having an electrode immersed therein,
a thin membrane consisting essentially of cellophane carried in said casing means and separating said anode and said cathode,
said anode contacting said membrane on one side only thereof and said solution contacting said membrane on the other side only thereof.

2. The battery of claim 1 wherein said anode comprises lithium.

3. The battery of claim 1 wherein said anode consists essentially of solid magnesium having a conductive member embedded therein.

4. The battery of claim 2 wherein said lithium is carried in a solution with ammonia.

5. The battery of claim 2 wherein said lithium is a solid.

6. The battery of claim 2 wherein said anode consists essentially of solid lithium having a conductive member embedded therein.

7. The battery of claim 2 wherein said electrode immersed in said solution consists essentially of nickel and the concentration of sulphur in said ammonia is between about 5% and 40%, based on the total weight of the solution of sulphur in ammonia.

8. The battery of claim 2 wherein said electrode immersed in said solution consists essentially of silver and the concentration of sulphur in said ammonia is between about 5% and 40%, based on the total weight of the solution of sulfur in ammonia.

9. The battery of claim 6 wherein said electrode immersed in said solution consists essentially of nickel and the concentration of sulphur in said ammonia is between about 5% and 40%, based on the total weight of the solution of sulphur in ammonia.

10. The battery of claim 6 wherein said electrode immersed in said solution consists essentially of silver and the concentration of sulphur in said ammonia is between about 5% and 40%, based on the total weight of the solution of sulphur in ammonia.

11. The battery of claim 1 wherein said casing means is provided with conduit means adapted to admit ammonia from an external source, and wherein said casing means is provided with structural support means.

12. The battery of claim 11 further comprising an additional cathode comprising a solution like that of said cathode and having an electrode immersed therein, and an additional thin membrane consisting essentially of cellophane carried in said casing means, said anode being disposed between said cathode and said additional cathode with said anode contacting said additional thin membrane on one side only thereof, and said solution of said additional cathode contacting said additional thin membrane on the other side only thereof, whereby said anode is separated from said cathode and said additional cathode by said membrane and said additional membrane.

13. The battery of claim 12 wherein said anode consists essentially of solid lithium having a conductive member embedded therein.

14. The battery of claim 13 wherein said conductive member comprises a metal screen having said solid lithium compacted thereabout.

15. The battery of claim 14 wherein said anode consists essentially of solid magnesium having a conductive member embedded therein.

References Cited

UNITED STATES PATENTS

| | | |
|---|---|---|
| 2,937,219 | 5/1960 | Minnick et al. |
| 2,996,562 | 8/1961 | Meyers. |
| 3,279,952 | 10/1966 | Minnick. |
| 3,355,328 | 11/1967 | Meyers et al. |

WINSTON A. DOUGLAS, *Primary Examiner.*

A. SKAPARS, *Assistant Examiner.*